United States Patent [19]

Parris et al.

[11] Patent Number: 5,371,824
[45] Date of Patent: Dec. 6, 1994

[54] BUFFER TUBE MATERIAL FOR THE PEDESTAL ENVIRONMENT

[75] Inventors: Donald R. Parris; Alan T. Parsons, both of Hickory, N.C.

[73] Assignee: Siecor Corporation, Hickory, N.C.

[21] Appl. No.: 953,332

[22] Filed: Sep. 30, 1992

[51] Int. Cl.5 ............................ G02B 6/44; C08K 3/34
[52] U.S. Cl. ...................... 385/109; 525/212; 524/456
[58] Field of Search ............... 385/109, 110, 111, 112; 525/124; 524/101, 145, 219, 221, 255, 291, 451, 456, 542; 528/250

[56] References Cited

U.S. PATENT DOCUMENTS

| | | | |
|---|---|---|---|
| 4,238,575 | 12/1980 | Kleiner et al. | 525/212 |
| 4,668,761 | 5/1987 | Aoshima et al. | 528/230 |
| 4,721,637 | 1/1988 | Suzuki et al. | 428/36 |
| 4,780,498 | 10/1988 | Goerrissen et al. | 524/456 |
| 4,837,400 | 6/1989 | Walter et al. | 524/145 |
| 4,927,585 | 5/1990 | Suzuki et al. | 264/171 |
| 5,031,996 | 7/1991 | Saller et al. | 385/109 |
| 5,141,993 | 8/1992 | Soil et al. | 525/154 |
| 5,191,011 | 3/1993 | Tajima et al. | 524/512 |

OTHER PUBLICATIONS

Celanese Engineering Resins Celcon Bulletin C1A ©1985.
Celanese Engineering Resins Celcon Bulletin C3B ©1983.

*Primary Examiner*—Akm E. Ullah
*Attorney, Agent, or Firm*—J. David Abernethy

[57] ABSTRACT

Disclosed is an optical transmission element for a light waveguide cable. At least one light waveguide is contained within a tube comprising a thermoplastic polyoxymethylene homopolymer or a copolymer thereof.

15 Claims, 1 Drawing Sheet

BUFFER TUBE MATERIAL FOR THE PEDESTAL ENVIRONMENT

BACKGROUND OF THE INVENTION

The present invention is directed to an optical transmission element comprising at least one light waveguide that is received in the interior of a tube comprising a thermoplastic polyoxymethylene homopolymer or a copolymer thereof.

Many light waveguide cables utilize interior elements consisting of a buffer tube holding one or more light waveguides therein. A filling compound may be inserted in the space between the light waveguide or light waveguides and the buffer tubes. One or more such optical transmission elements may be contained in an outer jacket. A prior patent for such an optical transmission element is U.S. Pat. No. 5,031,996, assigned to Siemens AG.

Many currently available buffer tubes holding light waveguides are made of either a single layer of PBT (polybutylene terephthalate) or a dual layer of PBT and PC (polycarbonate) or PBT and PA (polyamide). Other materials such as PEI (polyether imide) and fluoropolymers are sometimes used in certain applications.

Fiber optic cables are now being deployed further in the direction of homes and businesses. Such cables are exposed to the pedestal environment. A pedestal is the metal or plastic box that serves as a small branch or termination point in a local neighborhood. The pedestal has no temperature or humidity control and is susceptible to moisture, heat, and cold. Heat and humidity conditions which will degrade most standard buffer tube materials may become extreme in outdoor pedestals, particularly in some climate areas. Unfortunately, standard "unstabalized" PBT loses all its elongation to break after about two weeks of immersion in water at a temperature of 100° C., and after about eight weeks in water having a temperature of 80° C. Testing further shows that PBT loses around 45% of its original elongation to break after about 36 weeks and about 75% after 48 weeks of immersion in water having a temperature of only 60° C.

What is needed are buffer tube materials suitable for the pedestal environment which will not become brittle even after to prolonged exposure to hot, humid environment.

SUMMARY OF THE INVENTION

The objective of an improved optical transmission element is achieved with one or more light waveguides contained in a tube comprising a thermoplastic polyoxymethylene homopolymer or a copolymer thereof. The tube preferably also contains a filling compound to protect the light waveguides from moisture in an outdoor environment. This optical transmission element should have better stability when terminated in an outdoor pedestal than previous cable elements. The preferred tube material is a copolymer of trioxane and a lesser amount of comonomer.

DETAILED DESCRIPTION OF THE PREFERRED EMBODIMENT

Figure 1:
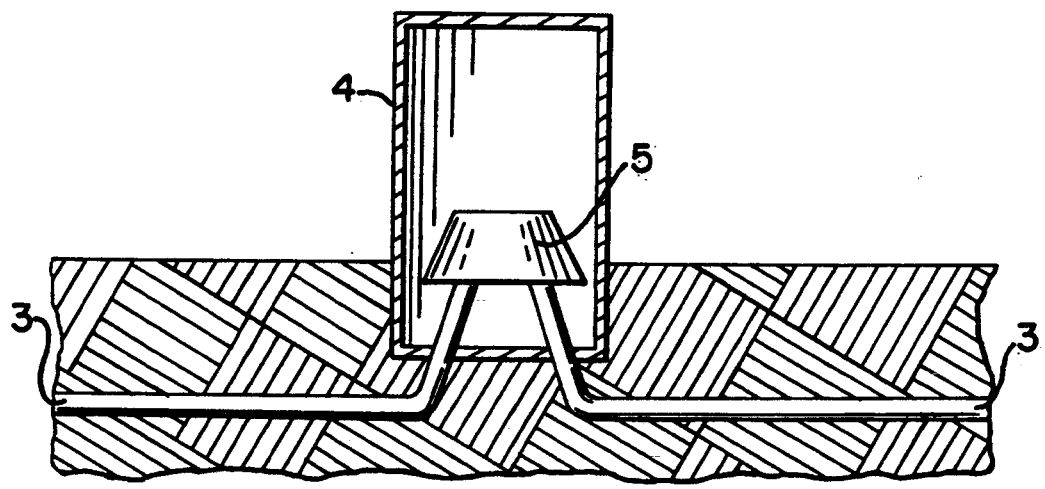
FIG. 1 is a schematic view of a cable containing the improved transmission element terminated in an outdoor pedestal.
Figure 2:
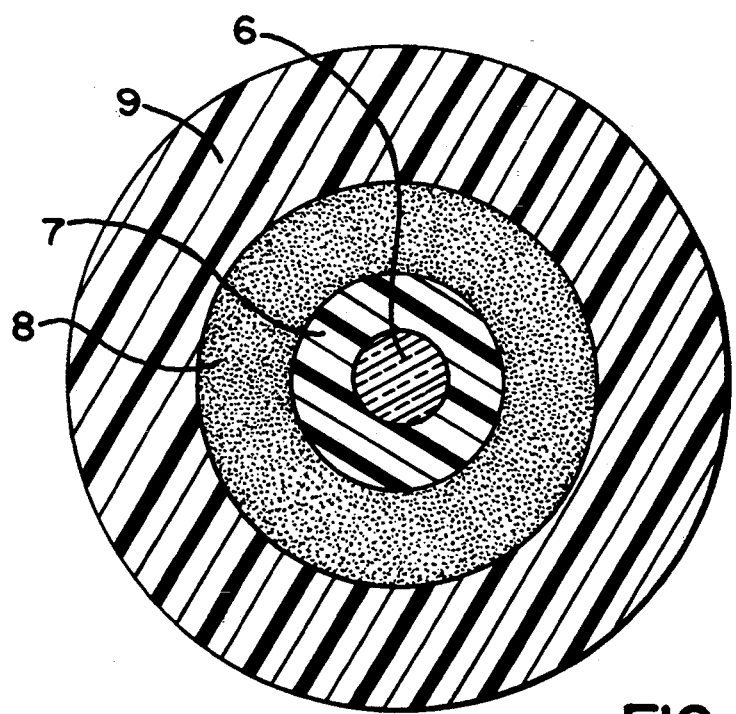
FIG. 2 is a cross sectional view through an optical transmission element in accordance with the present invention.

With reference to FIG. 1, a light waveguide cable 3, containing at least one optical transmission element as shown in FIG. 2, is terminated in a splicing and connectorization compartment 5 within outdoor pedestal 4. Other cables in optical connection with splicing and connectorization compartment 5 proceed from outdoor pedestal 4 to neighborhood subscribers.

The optical transmission element itself, as shown in FIG. 2, contains a light waveguide having a core 6 and other coatings 7. The light waveguide rests with excess fiber length in a filling compound 8, which may comprise an inorganic thixotropic agent, a hydrocarbon oil, as well as a thickening agent. Buffer tube 9 is composed of a copolymer of trioxane and a lesser amount of comonomer.

An example of such a material constituting buffer tube 9 is Celcon ® Acetal Copolymer, available from Celanese Engineering Resins, Inc. Typical processing conditions for extrusion of unreinforced Celcon ® UV 25 are a melt temperature of around 200° C. and a head pressure of around 210 Kg cm$^2$. Celcon ® has a high tensile strength, minimal moisture absorption, and low friction and wear properties.

Applicants have performed testing tending to show that Celcon ® loses about 35% of its original elongation to break when exposed to water having a temperature of 100° C. after over thirty (30) weeks of testing. In particular, it has been shown to stabilize at an elongation to break of 65% of its original value after twenty-four (24) weeks of testing at 60° C., while PBT shows no such stability as previously shown. When tested in air, the Celcon ® material retains a percentage elongation to break in excess of 30% and has good stability after thirty (30) weeks of testing. That is, the material becomes less brittle over time than PBT in hot environments of air or water.

It will be understood that those skilled in the art will make various minor modifications, and it should be understood that the spirit of the invention embodies all such modifications as properly come within the scope of the invention as claimed herein.

What is claimed is:

1. An optical transmission element comprising at least one light waveguide and a filling compound contained within a tube comprising a thermoplastic polyoxymethylene homopolymer or a copolymer thereof.

2. An outdoor pedestal containing the terminal end of a cable comprising at least one light waveguide contained within a tube comprising a thermoplastic polyoxymethylene homopolymer or a copolymer thereof.

3. An optical transmission element comprising a light waveguide contained within a tube comprising a copolymer of trioxane and a lesser amount of comonomer.

4. An optical transmission element as recited in claim 2, further comprising a filling compound contained within the tube.

5. An optical transmission element as recited in claim 3, further comprising a filling compound contained within the tube.

6. An outdoor pedestal containing a terminal end of a cable comprising at least one light waveguide contained within a tube comprising a copolymer of trioxane and a lesser amount of comonomer.

7. An optical transmission element as recited in claim 6, further comprising a filling compound contained within the tube.

8. An optical transmission element comprising at least one light waveguide contained within a tube comprising a thermoplastic polyoxymethylene homopolymer or a copolymer thereof which if exposed to water having a temperature of 100° C. for 30 weeks retains about 65% of its original elongation to break.

9. An optical transmission element as recited in claim 8 further comprising a filling compound contained within the robe.

10. An outdoor pedestal containing a terminal end of a cable comprising an optical transmission element as recited in claim 8.

11. An optical transmission element as recited in claim 8, wherein the tube comprises a copolymer of trioxane and a lesser amount of comonomer.

12. An optical transmission element as recited in claim 10, further comprising a filling compound contained within the tube.

13. An optical transmission element as recited in claim 11, further comprising a filling compound contained within the tube.

14. An outdoor pedestal containing a terminal end of a cable comprising an optical transmission element as recited in claim 11.

15. An optical transmission element as recited in claim 14, further comprising a filling compound contained within the tube.

* * * * *